United States Patent [19]

Linderman et al.

[11] Patent Number: 4,635,677
[45] Date of Patent: Jan. 13, 1987

[54] VALVE MANIFOLD MOUNTING BRACKET

[75] Inventors: Ray D. Linderman, Streetsboro; Peter C. Williams, Cleveland Heights, both of Ohio

[73] Assignee: Whitey Co., Highland Hts., Ohio

[21] Appl. No.: 726,417

[22] Filed: Apr. 24, 1985

[51] Int. Cl.$^4$ .............................................. F16L 5/00
[52] U.S. Cl. ................................... 137/356; 137/343; 251/143; 248/207
[58] Field of Search ..................... 137/343, 884, 356; 251/143; 248/207, 230

[56] References Cited

U.S. PATENT DOCUMENTS

| | | | |
|---|---|---|---|
| 1,454,222 | 5/1923 | Palmer et al. | 73/861.62 |
| 2,020,432 | 11/1935 | Parker | 73/861.49 |
| 2,096,035 | 10/1937 | Handwerk | 73/861.45 |
| 2,365,573 | 12/1944 | McGay | 73/716 |
| 3,195,561 | 7/1965 | Sovitzky | 251/143 |
| 3,232,568 | 2/1966 | Lennon et al. | 137/343 |
| 3,431,935 | 3/1969 | Bowditch | 137/866 |
| 3,746,371 | 7/1973 | Leopold, Jr. et al. | 73/201 |
| 3,817,283 | 6/1974 | Hewson | 137/884 |
| 3,901,269 | 8/1975 | Henderson | 137/340 |
| 4,182,362 | 1/1980 | Hewson et al. | 137/343 |
| 4,193,420 | 3/1980 | Hewson | 137/356 |
| 4,284,100 | 8/1981 | Scapes et al. | 137/343 |
| 4,319,492 | 3/1982 | Hewson et al. | 73/756 |
| 4,432,392 | 2/1984 | Paley | 137/343 |

Primary Examiner—A. Michael Chambers
Assistant Examiner—Sheri M. Novack
Attorney, Agent, or Firm—Fay, Sharpe, Fagan, Minnich & McKee

[57] ABSTRACT

A mounting bracket for securing a manifold valve to a support pipe is provided wherein plural support members extend outwardly from one leg of the bracket. The support members are designed to accommodate various manifold conformations, selective use of a steam block, and use of the same size mounting bolts. The mounting bracket is adaptable to securing on both horizontal and vertical support pipes through the use of a pair of U-bolts cooperating with four symmetrically spaced apertures. The mounting bracket facilitates installation of a differential pressure cell to an associated valve manifold independently from initial assembly of the manifold to the mounting bracket and connection of fluid system piping to the manifold.

11 Claims, 5 Drawing Figures

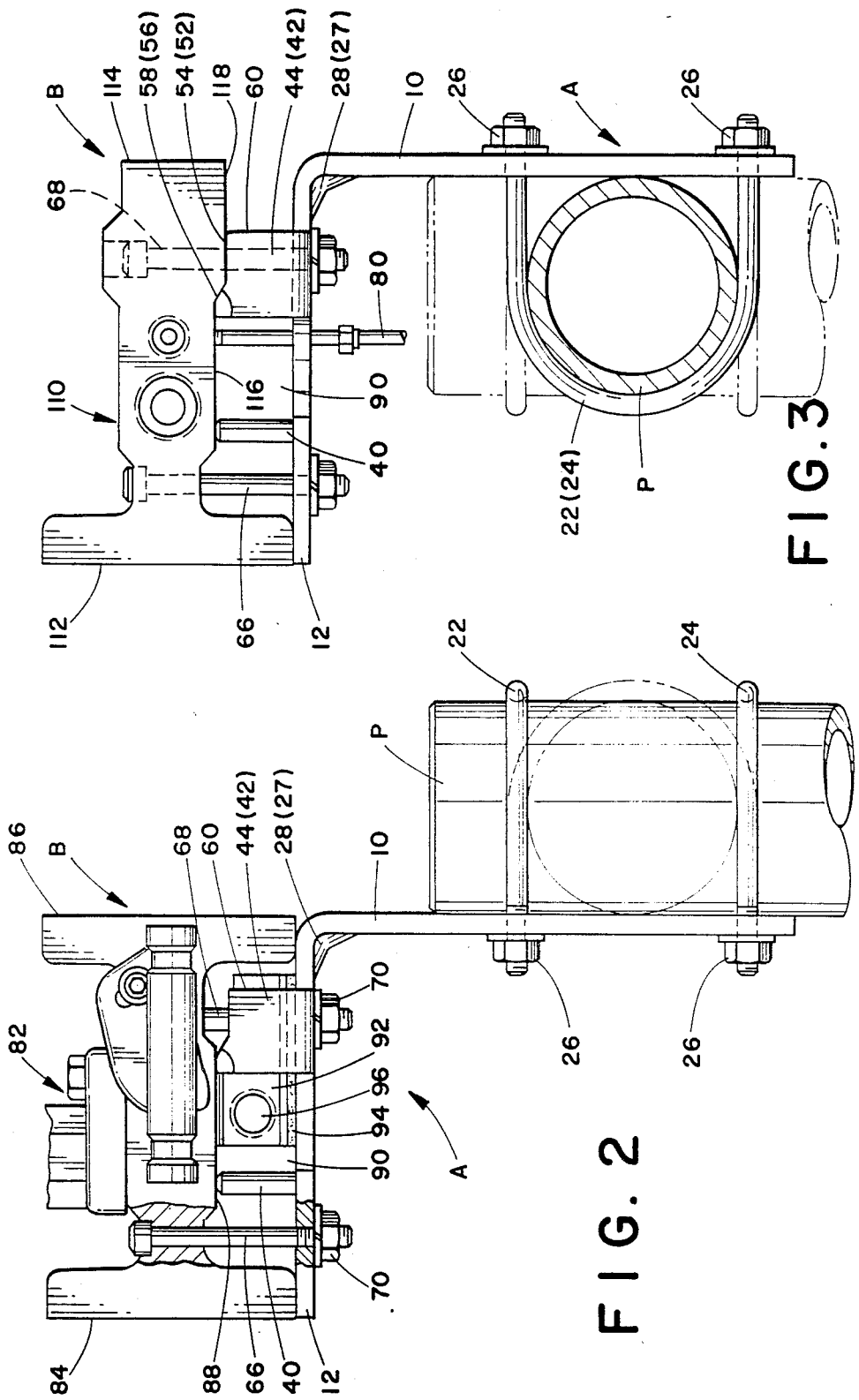

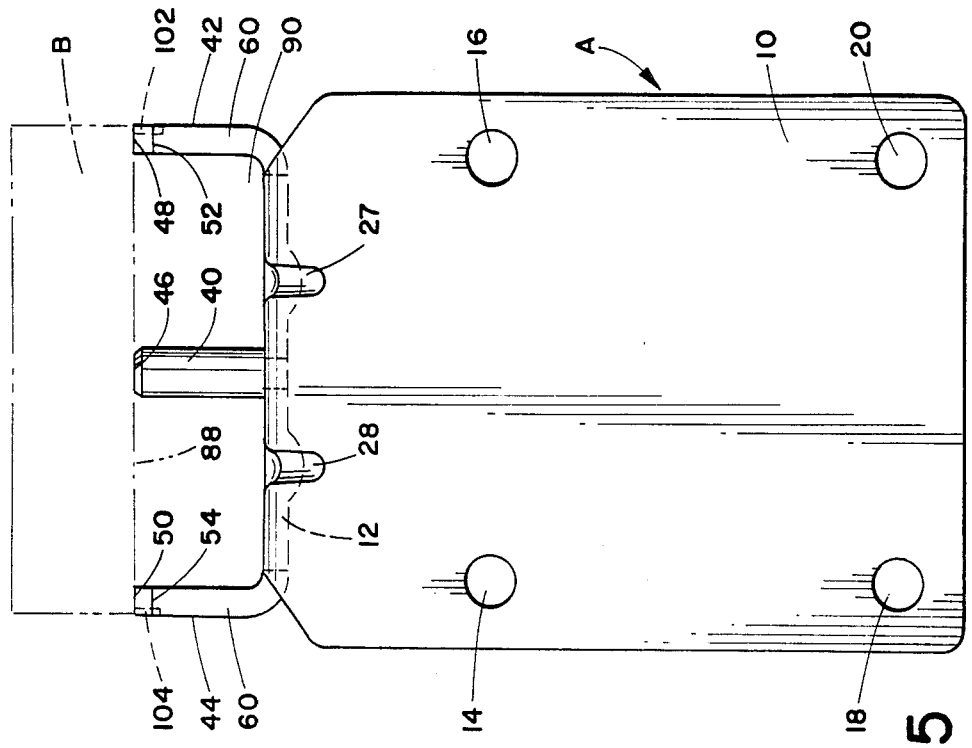
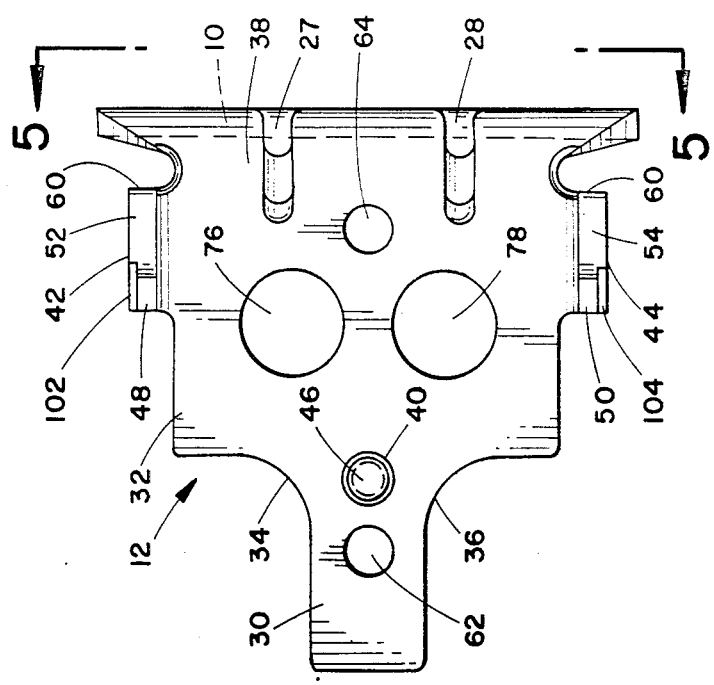
FIG. 4
FIG. 5

VALVE MANIFOLD MOUNTING BRACKET

BACKGROUND OF THE INVENTION

This invention pertains to the art of valve manifold assemblies and, more particularly, to such an assembly which includes means for mounting the valve manifold to a pipe or other support structure.

The invention is particularly applicable to a valve manifold assembly provided with a differential pressure cell and will be described with particular reference thereto. However, it will be appreciated that the invention has broader applications and may advantageously be employed in other environments.

Conventionally, valve manifolds and differential pressure cells have been mounted simultaneously for connection with their associated fluid systems. The differential pressure cells were installed prior to the completion of construction whereby damage to the instruments often occurred due to their inherently delicate nature. Additionally, any servicing of the assemblies which was required at a later date necessitated the presence of both a pipefitter and an instrument man in order to disconnect the piping from the manifold and allow access to the differential pressure cell. This process was, of course, time consuming and added further expense to the procedure.

Later developments in valve manifold assemblies have suffered from the lack of interchangeability and adaptability to various factors encountered in the field. An installer of these assemblies was required to maintain a variety of parts on hand depending upon the type of valve manifold used and whether a steam block was incorporated into the installation. The prior art mounting brackets were unable to accommodate both flange-to-flange and pipe-to-flange connections. A different set of connecting bolts was required if the assembly was to utilize a steam block for maintaining flowable characteristics in a viscous system fluid. Purge lines to drain the assembly were an afterthought, and no provision was made to protect their connection. Also, the use of a single mounting connection led to decreased stability of the mounted assembly.

The foregoing and other disadvantages have been experienced for many years and no single structure has been proposed to eliminate them. The subject invention overcomes the foregoing problems and others, and provides a mounting bracket for a valve manifold which is more effective and universal in use.

SUMMARY OF THE INVENTION

According to the present invention, an improved mounting bracket is provided which securely fastens a differential pressure cell and a valve manifold to a support structure. The bracket has a pair of generally planar legs in angularly disposed relation to each other wherein the first leg has interchangeable securing means for selectively mounting the bracket to a support structure. The second leg has plural support members which extend outwardly therefrom and support the valve manifold a predetermined distance from the second leg.

In accordance with another aspect of the invention, the plural support members are designed to accommodate different valve manifold configurations. Selected support members are provided with a pair of support surfaces and facilitate use of the same size mounting bolts.

In accordance with another aspect of the invention, the plural support members and valve manifold define a cavity which allows advantageous, selective mounting of a steam block intermediate the manifold and bracket second leg. Use is made of the same size mounting bolts in installations with and without the steam block.

According to another aspect of the invention, the first leg is provided with four symmetrically spaced apertures that accommodate a pair of U-bolts. The U-bolts may be rotated 90° for association with a different pair of the four apertures. This versatility allows the subject new bracket to be mounted on either horizontal or vertical support members.

One advantage of the subject new bracket resides in the versatile mounting of the bracket to a support member.

Another advantage is found in the capability of using the same mounting bolts when plural valve manifold configurations are used.

Still another advantage is the provision made for accommodating a steam block or purge lines at the initial installation, or at some later time.

Further benefits and advantages of the invention will become apparent to others upon a reading and understanding of the following detailed description of the preferred embodiment.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 2 is a view of the FIG. 1 installation in the assembled condition with portions thereof broken away or in cross-section for ease of illustration;

FIG. 3 is a view similar to FIG. 2 illustrating use of the mounting bracket with a pipe-to-flange type valve manifold, and the reversibility of the mounting bolts;

FIG. 4 is a plan view of the subject new mounting bracket particularly illustrating the location of various apertures and the spatial relationship between the manifold support members; and, FIG. 5 is a front end view of the mounting bracket in the direction of lines 5-5 in FIG. 4 with an associated valve manifold being shown in phantom in supported relation on the support members.

DETAILED DESCRIPTION OF THE PREFERRED EMBODIMENT

Figure 1:
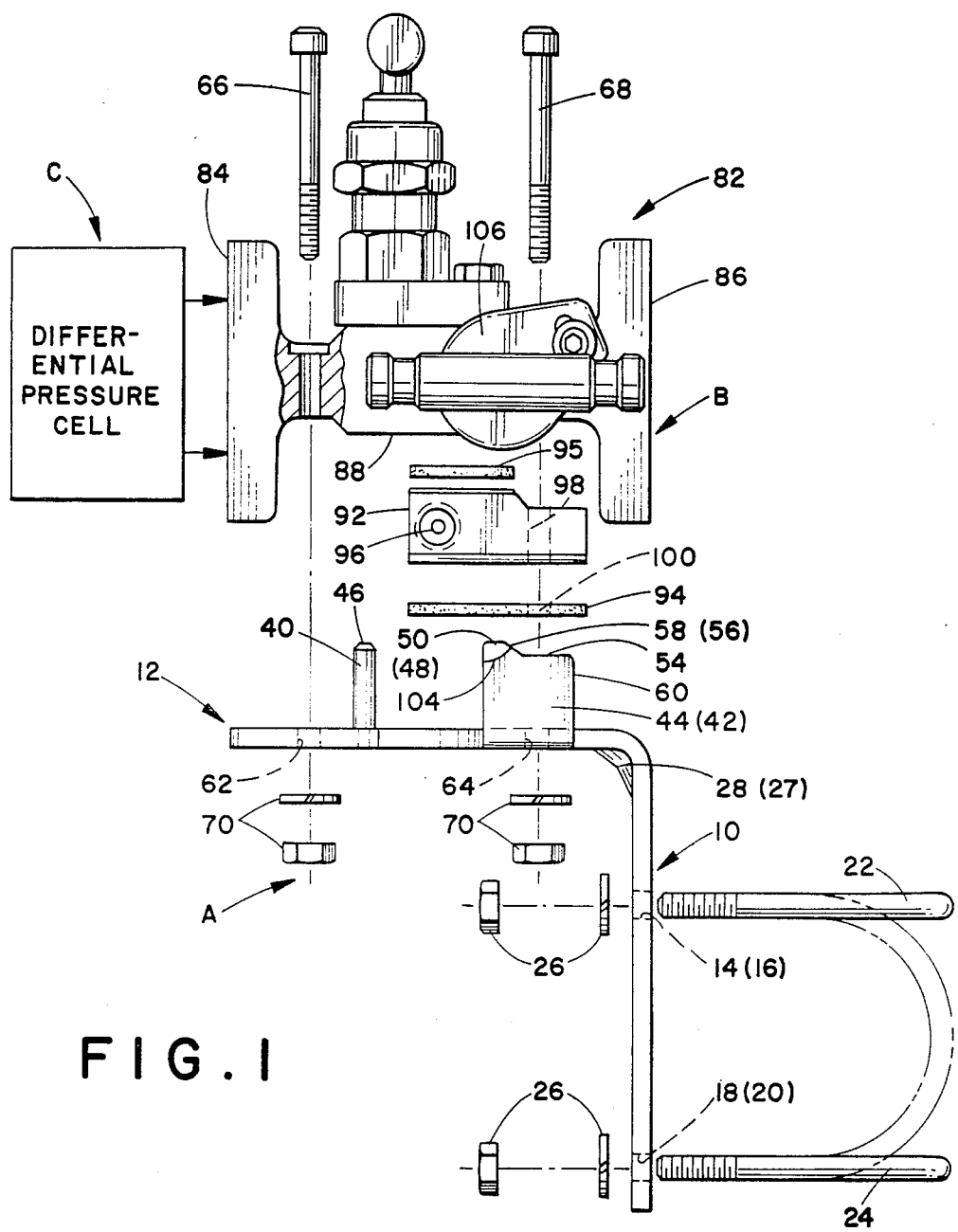
FIG. 1 is an exploded side view of a mounting bracket installation formed in accordance with the subject invention as it is used with a valve manifold having flange-to-flange type connections.

Referring now to the drawings wherein the showings are for purposes of illustrating the preferred embodiment of the invention only and not for purposes of limiting same, FIG. 1 shows the subject new mounting bracket A disposed in spaced relation to a flange-to-flange valve manifold B which, in turn, is adapted to fixedly receive a differential pressure cell C in operative communication therewith. As is well understood in the art, the valve manifold is also adapted for connection to a fluid system (not shown).

More particularly, and with reference to FIGS. 1, 4, and 5, the mounting bracket is generally L-shaped and includes a pair of legs 10, 12 which adapt the bracket for connection to a support pipe P and provide support for the valve manifold, respectively. As best seen in FIGS. 1 and 5, the first leg 10 has four spaced apart apertures 14, 16, 18, 20 which are adapted to receive a pair of U-bolts 22, 24. The apertures 14, 16, 18, 20 are arranged equidistantly apart from each other in both lateral and longitudinal directions relative to the first leg. Due to this symmetrical arrangement, the U-bolts 22, 24 may be inserted for mounting the second leg of the bracket to a vertically (FIG. 2) or horizontally (FIG. 3) disposed support pipe or other support structure P.

When mounted to a vertical support pipe, extending legs of the U-bolts pass through one of the laterally spaced apertures pairs 14, 16 or 18, 20. Alternatively, if the support pipe is disposed in a horizontal orientation, the legs of the respective U-bolts pass through one of the longitudinally spaced aperture pairs 14, 18 or 16, 20. In either case, the closed ends of the U-bolts closely embrace the outer periphery of support or pipe P. The outermost ends of the U-bolt legs are threaded and receive conventional nut and washer assemblies 26 for fixedly securing mounting brackert A to the support structure as is well understood in the art. Use of a pair of bolts assures increased stability of the mounting bracket in the installed condition. Other, similar securing means such as band clamps or separate clamp and bolt members may be used with equal success as will be appreciated by one skilled in the art.

The second leg 12 of the mounting bracket is disposed generally normal to first leg 10, and a pair of spaced apart corner ribs or gussetts 27, 28 are provided at the interface between legs 10, 12 for providing increased strength in the bracket structure. It is apparent that the first and second legs 10, 12 may be comprised of two separate members welded or secured together in another manner, but an integral structure bent along the interface is deemed preferable. Gussets 27, 28 are recessed at an angle of approximately 45° from the perpendicularly disposed planes defined by the first and second legs. The decreased angle of the gusset provides a smoother transition and greater strength between the legs.

Second leg 12 is defined by three interconnected sections of varying width as best shown in FIG. 4. The first section 30 is the narrowest of the three and is disposed at the outer free end of the second leg 12. The second section 32 is of intermediate width, and the varying widths of the first and second sections are connected by arcuate surfaces 34, 36. These surfaces provide wrench clearance for access to bolt heads of the like which fasten differential pressure cell C to manifold valve B. The width of the second section provides clearance for connections to a steam block in a manner to be described hereinbelow. The third section 38 of the second leg has the greatest width, and is disposed adjacent the interface of the second leg with first leg 10.

Referring now to FIGS. 1, 2, 3, and 5, three support members 40, 42, and 44 are shown as extending outwardly from second leg 12 in a generally normal relationship thereto. First support member or pin 40 extends outwardly from the first section 30. The first support member may be machined to a reduced diameter for a press fit into a suitable aperture provided in the second leg 12. Alternatively, the first support member may be secured to the second leg in any convenient manner. Second and third support members 42, 44 are identical in conformation and define the outermost width of third section 38. The second and third support members 42, 44 are particularly illustrated in FIG. 5 as comprising integral upturned edges of the third section 38. These two support members 42, 44 may, alternatively, constitute separate members secured in a well-known manner to third section 38.

As particularly apparent in FIGS. 2 and 5, the uppermost portions of the three support members extend outwardly the same distance from the second leg 12 of the mounting bracket to define a manifold support plane. First support member 40 has a smooth, continuous outer support surface 46 which corresponds with the outermost support surfaces 48, 50 of the second and third support members. Second and third support members 42, 44 also have inner support surfaces 52 and 54, respectively. The inner and outer support surfaces of each of the second and third support members merge together along interconnecting areas 56 and 58 (FIG. 1). End faces 60 on each of the second and third support members are shown in spaced relation to manifold valve B, and the inner and outer support surfaces allow the mounting bracket to adapt to various valve manifold configurations as will be further described hereinbelow.

A pair of mounting bracket fastener holes 62 and 64 are defined in the first and third sections 30, 38, respectively. A pair of elongated threaded fasteners 66 and 68 (FIG. 1) pass through these holes and corresponding holes provided in the valve manifold for fixedly securing the valve to the mounting bracket. A pair of nut and washer assemblies 70 received on the fasteners facilitate secure mounting of valve manifold B to bracket A.

A pair of apertures 76, 78 through second leg 12 provide convenient means to run purge lines from the valve manifold B through the bracket in protected fashion. Conventionally, purge lines have not been provided for or were located exteriorly of the mounting bracket. The above-noted apertures in the subject new bracket provide protection to purge lines such as are designated by numeral 80 in FIG. 3.

The mounting bracket A is designed for use in a wide variety of environments and, thus, is preferably constructed of carbon steel. The cut-outs, apertures, recesses, and the like may be formed by drilling, cutting, or other well-known machining processes. Designated portions of the bracket may also be constructed of stainless steel because of its high quality and durable characteristics. Other suitable materials may also be used with success in practiciing the overall concepts of the preferred embodiment.

Focusing attention on FIGS. 1 and 2, valve manifold B includes a flange-to-flange type manifold body 82 as a part thereof. A first flange 84 at one or a rear end of the manifold body is adapted for connection with a conventional differential pressure cell C by threaded fasteners or the like. In a similar manner, a second flange 86 at the other or forward end of the manifold body is adapted for connection to an associated fluid system as is known. The interconnections of the first and second flanges, as well as the operation of valve manifolds in general, are well known in the art and form no part of this invention. Therefore, no further discussion is deemed necessary for a full and complete understanding of the construction and use of the mounting bracket itself.

The bottom wall 88 of the manifold body is recessed with respect to the first and second flanges 84, 86, and is designed for supported engagement with the first, second, and third support members 40, 42, and 44 as shown in FIG. 2. When mounting fasteners 66, 68 are tightened so that manifold body 82 is brought into its final supported position on support members 40, 42, 44, a cavity area 90 is formed therebetween. The boundaries of this cavity are generally defined by the support members, mounting bracket second leg 12, and the bottom surface 88 of the flange-to-flange manifold body.

Cavity 90 is adapted to closely receive a steam block 92 and accompanying gaskets 94, 95. Although the cavity is shown as closely receiving the steam block and gasket relative to the flange-to-flange valve manifold installation, it similarly will receive a steam block in a pipe-to-flange manifold as will be described hereinafter. Bottom surface 88 of the manifold body is supported a predetermined distance from the second leg such that the same mounting fasteners 66, 68 are utilized to fixedly secure the valve manifold to the bracket, whether or not a steam block 92 is incorporated into the system. The gasket 94 is designed to provide thermal insulation between the steam block and second leg of the mounting bracket, and the gasket 95 is designed to provide thermal conduction between the steam block and the bottom wall of the manifold body in manners known in the art.

Steam blocks are conventionally used in this type of environment where the viscosity of the system fluid is such that the fluid will not transmit pressure properly unless it is maintained at elevated temperatures. If the viscosity or fluidity of the system fluid is not a problem, the steam block may be omitted from the installation. The steam block 92 has plural openings 96 designed to receive terminal ends of a steam trace lines (not shown) that surround the fluid system lines in a known manner. The steam block has a further opening 98 adapted to closely receive mounting fastener 68 to effect positive retention thereof in cavity 90. The gasket 94 includes an aperture 100 for similar retention and for alignment purposes.

The end faces 60 of the second and third support members 42, 44 are designed to accommodate various sized second flanges 86. Frequently, the second flanges are constructed of varying thicknesses so that the end faces 60 must be recessed sufficiently to accommodate them. Additionally, the second and third support members have shaved outer faces 102, 104, respectively. Faces 102, 104 (FIGS. 4 and 5) are adapted to receive the peripheral portion 106 of a locking collar (FIG. 1) which prevents loosening of a bonnet assembly associated with manifold 82. The details of the locking collar and bonnet do not form a specific part of the present invention and are not, therefore, described in detail herein.

FIG. 3 shows a conventional pipe-to-flange manifold body 110 as an alternative to the above-described flange-to-flange manifold. The flange 112 of this manifold body is adapted for connection in a conventional manner with a differential pressure cell (not shown), while the opposite end 114 of the pipe-to-flange manifold body receives the fluid system lines (not shown). Again, the interconnections of the flange and pipes, as well as the overall operation of the valve manifold, form no part of this invention and need not be described in detail for a full and complete understanding of the subject new mounting bracket.

A first bottom surface portion 116 of the pipe-to-flange manifold body 110 generally corresponds to bottom surface 88 of the flange-to-flange manifold body previously described, and is designed to be placed in supported relation with respect to support surface 46 of first support member 40 and support surfaces 48, 50 of the second and third support members, respectively. A second bottom surface portion 118 of the manifold body is disposed in supported relation with the inner abutting surfaces 52, 54 and interconnecting areas 56, 58 of the second and third support members. In this manner, the pipe-to-flange valve manifold is supported along the first support member, as well as along the outer and inner supporting surfaces of both the second and third support members 42, 44.

In FIG. 3, cavity 90 has been left open for later accommodation of a steam block as may be necessary, while purge lines 80 extend downwardly from valve manifold 110 and through the mounting bracket second leg 12. Manifold body 110 is supported a predetermined distance from the second leg 12 by the support members. As described above, the predetermined distance assures sufficient clearance for inclusion of a steam block into the system. If there is no requirement to include the steam block, the cavity remains open. An installer need not stock separate mounting fasteners for accommodating the various valve manifold and steam block combinations which may be encountered in the field. Mounting fasteners 66, 68 are universal, and wholly adequate for all combinations. The U-bolts in FIG. 3 have also been rotated 90° from the mounting in FIG. 2 for showing another versatile feature of the subject new bracket.

Mounting bracket A is designed to permit valve manifold mounting to a vertical or horizontal support structure or pipe and will accommodate purge lines or steam block accessories. The arcuate surfaces 34, 36 facilitate adaptation of the differential pressure cell C. The reduced width of the second leg second section 32, and the reduced width of second and third support members 42, 44 provide clearance for connecting a steam block to the installation.

As is evident from the above description, the three support members 40, 42, and 44 accommodate either a flange-to-flange manifold body 82 or a pipe-to-flange manifold body 110, while utilizing the same mounting fasteners 66, 68. There is no need for separate fasteners of varying lengths to accommodate mounting of different valve manifolds to the bracket. Further, the support members define a cavity which is adapted to receive a steam block.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A mounting bracket for securely fastening a differential pressure cell and a valve manifold to a support structure, said mounting bracket comprising:
   a bracket body defined by first and second generally planar legs disposed in an angularly disposed relationship with each other and being joined at an interface area;
   means associated with said first leg for interchangeably securing the mounting bracket to an associated support structure;
   plural support members extending substantially normal from the plane of said second leg and defining a support plane supportingly engaging an associated valve manifold at some predetermined distance from said second leg; and, said plural support members including at least first, second, and third support members, said first support member being disposed at a narrowed width portion of said second leg spaced toward a free terminal end thereof, and said second and third support members being spaced along said second leg intermediate said first support member and said interface area, said second and third members each having a pair of surfaces adapted to accommodate different associated valve manifold configurations, and said support members adapted to receive a steam block therebetween while allowing said supporting engaging relationship between said second leg and said valve manifold as well as associated piping therewith to be continuously maintained.

2. The mounting bracket as defined in claim 1 wherein said second leg has a narrowed width at a terminal end thereof spaced from said interface area.

3. The mounting bracket as defined in claim 1 further including an aperture through said second leg adapted to accommodate purge lines.

4. The mounting bracket as defined in claim 1 wherein said securing means includes at least four through apertures in said first leg spaced in longitudinal and lateral symmetry with each other for receiving the outer ends of a pair of U-shaped fasteners.

5. The mounting bracket as defined in claim 1 wherein said first, second, and third members define a portion of a cavity adapted to receive a steam block.

6. The mounting bracket as defined in claim 5 wherein said interface area includes a pair of gussets communicating with said first and second legs for providing greater strength therebetween.

7. A mounting bracket for securely fastening a differential pressure cell and a valve manifold to a support structure comprising:

normal relationship and being joined to each other at an interface area;

means in said first leg for interchangeably fastening the mounting bracket to a support structure;

plural support members extending substantially normal from said second leg, at least one of said support members having first and second support surfaces adapted for positively supporting a first associated valve manifold configuration on said first support surface a first predetermined distance from said second leg and for supporting a second associated valve manifold configuration on said second support surface a second predetermined distance from said second leg;

a cavity having a predetermined thickness dimension defined between said plural support members, said second leg, and the associated valve manifold, said cavity being adapted to receive a steam block therein; and, means extending through said second leg for protectively accommodating purge lines extending to the associated valve manifold.

8. The mounting bracket as defined in claim 7 wherein said fastening means includes a pair of U-shaped fasteners having distal ends, each U-shaped fastener being oriented to selectively pass through one of two pairs of apertures symmetrically arranged in said first leg.

9. A mounting bracket for supporting a valve manifold and differential pressure cell in fixed relation with a support pipe comprising:

an elongated first leg having at least four apertures disposed in symmetrical relation with each other and adapted to receive the free ends of a pair of U-bolts in one of two alternative orientations;

an elongated second leg integral with said first leg at an interface area and defining a generally L-shaped conformation with said first leg, said second leg including:

a first section disposed at an outer free end of said second leg, a second section adjacent said first section having a width greater than the width of said first section, and a third section disposed intermediate said second section and said interface area and having a width greater than said second section;

said first section having a first mounting opening passing therethrough adapted to receive a valve manifold first mounting bolt, and a first support member extending some predetermined distance outwardly therefrom substantially normal thereto;

said second section including a pair of apertures adapted to receive purge lines therethrough from an associated manifold valve;

said third section having a second and third support members extending said predetermined distance outwardly therefrom substantially normal thereto, said second and third support members being positioned along opposed lateral side edges of said third section;

each of said second and third support members having first and second support surfaces, said first support surfaces being spaced from said second leg by said predetermined distance, and said second support surfaces being spaced from said second leg by some distance less than said predetermined distance, and said second and third support members each including an interconnecting area extending between the first and second support surfaces thereof; and, said third section having a second mounting opening passing therethrough adapted to receive a valve manifold second mounting bolt.

10. The mounting bracket as defined in claim 9 wherein said first, second, and third support members define a steam block cavity between said second leg and an associated valve manifold supported by said support members.

11. The mounting bracket as defined in claim 9 wherein said first support member and said first support surface of said second and third support members are adapted to contact selected areas of a valve manifold having a predetermined first design; and, wherein said first support member and at least said first and second support surfaces of said second and third support members are adapted to contact a selected area of valve manifold having a predetermined second design different from said first design.

* * * * *